W. A. TURPIN & D. G. SNODGRASS.
MACHINE FOR STUDDING TIRE BANDS AND TIRE TREADS, AND FOR SIMILAR PURPOSES.
APPLICATION FILED MAR. 17, 1914.

1,237,422.

Patented Aug. 21, 1917.
6 SHEETS—SHEET 1.

Witnesses:
Inventors:

UNITED STATES PATENT OFFICE.

WILLIAM ALFRED TURPIN, OF LONDON, AND DONALD GARDNER SNODGRASS, OF BIRMINGHAM, ENGLAND, ASSIGNORS TO THE DUNLOP RUBBER COMPANY, LIMITED, OF BIRMINGHAM, ENGLAND.

MACHINE FOR STUDDING TIRE-BANDS AND TIRE-TREADS, AND FOR SIMILAR PURPOSES.

1,237,422.         Specification of Letters Patent.      Patented Aug. 21, 1917.

Application filed March 17, 1914. Serial No. 825,286.

*To all whom it may concern:*

Be it known that we, WILLIAM ALFRED TURPIN and DONALD GARDNER SNODGRASS, both subjects of the King of Great Britain, residing, respectively, at Warple Way, Acton Vale, London, in the county of Middlesex, England, and Manor Mills, Salford street, Aston, Birmingham, in the county of Warwick, England, have invented certain new and useful Improvements in Machines for Studding Tire-Bands and Tire-Treads, and for Similar Purposes, of which the following is a specification.

This invention relates to a machine for studding tire bands, tire treads, and for similar purposes, and has for its chief object to avoid the employment of several manual operations which have hitherto been necessary for providing the tire treads with non-slipping or wearing studs, thus enabling the studs to be inserted and secured in the tire treads more quickly and with greater accuracy than heretofore.

According to this invention a machine is provided, which is so constructed and arranged that it automatically inserts and secures the studs in the tire tread or the like.

The machine may comprise a feed device or mandrel for supporting and moving the tire tread or the like which is to be provided with the studs, a punching device for perforating the tire tread, and a stud inserting and securing device. The latter may comprise the device which inserts the stud into the tire tread and mechanism for applying and securing a retaining washer to each of the inserted studs. The tire tread is perforated ready to receive the studs which are successively pressed into the perforations, after or during which operation the washer is applied to the stem of the inserted stud, and the latter is simultaneously burred by the washer applying mechanism to retain the washer on the stud. The mandrel or support may be intermittently rotated or moved by a ratchet driving wheel actuated by an adjustable pawl, and suitable locking devices or plungers coöperate with the ratchet wheel to retain the same and the mandrel stationary when the punching operation and the stud inserting and securing operation take place. The studs and washers may be automatically supplied from separate hoppers to separate carrier devices which move the studs and washers one at a time to enable the studs to be pressed into the tire tread by the stud inserting device, and the washer to be applied. The movement of the stud inserting and securing device, and the stud and washer carrier devices may be effected by eccentrics mounted on the main driving shaft, the said eccentrics being adapted to be coupled to and uncoupled from the driving shaft by clutches actuated by suitable hand levers.

The mandrel or support can be adjusted after the studs in each circular row are inserted and secured in the tire tread to enable another row to be completed, and means are provided for inserting the studs in each alternate row, in different positions from the other intervening row or rows.

In order that the said invention may be clearly understood and readily carried into effect, the same will now be described more fully with reference to the accompanying drawings in which:—

Fig. 28 illustrates a gage device hereinafter referred to.

$a$ is the mandrel for supporting the tire tread; $b$ and $c$ are the punch and die respectively, constituting the perforating device, $d$ is the device (hereinafter referred to as the "stud presser") for inserting the studs into the tire tread; $e$ is the device (hereinafter referred to as the "washer presser") for applying the washer to the inserted stud; $f$ is the main driving shaft from which the movement for actuating the aforesaid contrivances is derived, the main driving shaft $f$, and the said contrivances all being suitably mounted or supported on a frame or casting $g$ which constitutes the body and base of the machine. The mandrel $a$ comprises a perforated rim which is connected to a hub $a'$ by radial arms $a^2$ and is slidably but non-rotatably secured on the front end of a horizontal shaft $a^3$, to the rear end of which is secured a ratchet driving wheel $h$, the said shaft being supported on a slide $a^7$ which is mounted on the body $g$ so as to be capable of vertical adjustment by a hand wheel $a^8$, while the adjustment of the mandrel along the shaft $a'$ is effected by a hand wheel $a^9$ having a threaded spindle which screws into the horizontal shaft $a^3$. The mandrel is so connected to the hand wheel $a^9$ that when the latter is rotated and moved longitudinally the mandrel slides along the shaft $a^3$ without rotating thereon and said mandrel can be secured to the shaft $a^3$ when in the required position by a spring controlled pin $a^{10}$ (see Fig. 3). The said ratchet driving wheel $h$ is actuated by a reciprocating pawl $i$ so as to intermittently rotate the shaft $a^3$ and the mandrel (in the direction of the arrow shown in Fig. 1) which after being adjusted can be positively connected to the shaft by the hand operated locking pin $a^{10}$, the movement of the driving pawl $i$ being effected by a cam $i'$ mounted on the end of a shaft $i^2$ which is rotated by bevel gearing $i^3$ from the main driving shaft $f$ (see Fig. 2). The outer surface of the rim of the mandrel is approximately convex in shape, and the perforations in the rim determine the position or arrangement of the studs in the tire tread; for example there may be three peripheral rows of holes or perforations $a^4$, $a^5$, $a^6$ in the mandrel the middle row $a^5$ being staggered with regard to the outer rows $a^4$ and $a^6$. The rim of the mandrel is arranged to rotate between the punch $b$ and die $c$ and between the stud presser $d$ and the washer presser $e$, and the mandrel can be adjusted on its horizontal shaft $a^3$ so that each peripheral row of perforations $a^4$, $a^5$, $a^6$ can be moved into a vertical plane which is transverse with respect to the machine and passes through the punch and die and the stud and washer pressers. The intermittent rotation of the mandrel is such that each hole or perforation in any one of the aforesaid rows, successively coincides or registers first with the common axis of the punch and die, and afterward with the common axis of the stud and washer pressers when each periodical stoppage of the mandrel, takes place at which time the punching and the stud inserting and securing operations are performed. In order that the extent of each movement of the ratchet driving wheel $h$ and the mandrel $a$ shall be precisely the same, controlling or locking devices or plungers $j$ or $j^x$ coöperate with a circumferential row of equi-distant holes $h'$ in the ratchet wheel adjacent to the peripheral teeth thereon, the distance between the said holes corresponding to the distance between the holes in each peripheral row in the mandrel. Immediately the driving pawl $i$ has moved the ratchet driving wheel $h$ a step forward, the plunger $j$ is adapted to move under the influence of a spring $j'$ so that its outer end enters and projects through one of the holes $h'$ in the ratchet driving wheel, the said end being preferably rounded to facilitate its entry into the hole in the ratchet wheel. When the said pawl $i$ is again about to move the ratchet driving wheel another step forward, a rotary cam or lifter $j^2$ secured on the main driving shaft $f$ engages with a lateral projection $j^3$ on the plunger and pulls the latter against its spring $j'$ out of engagement with the ratchet wheel thereby permitting the latter to be driven a step farther in the forward direction to the next position, at which time the plunger will be released by the cam $j^2$ so as to move under the influence of its spring into engagement with the next hole $h'$ in the said ratchet wheel. This operation takes place after each forward movement of the ratchet driving wheel and the mandrel, that is to say after each punching operation and stud inserting and securing operation has been performed.

Figures 7, 8, 9, 10:
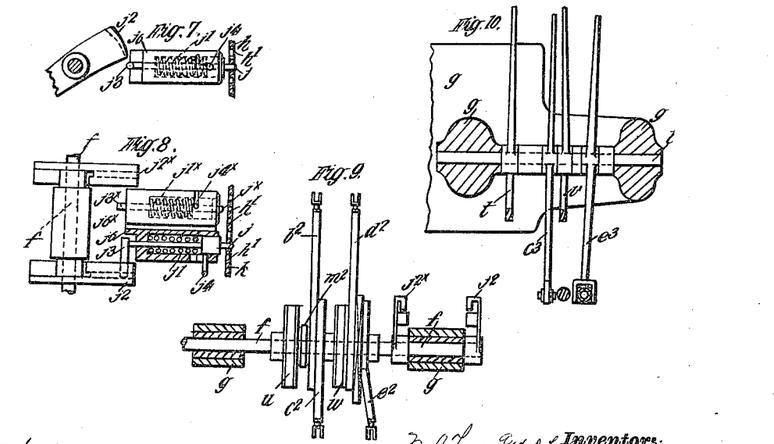
Figs. 7 and 8 are respectively a side elevation and a sectional plan (drawn on a larger scale) of the controlling or locking plungers for the ratchet driving wheel.
Fig. 9 is a front elevation of the various driving or operating eccentrics.
Fig. 10 is a sectional plan showing the lower stationary shaft on which the hand actuating and other levers are pivoted.

The driving pawl $i$ is movably secured to a carrier $i^4$ and by means of an adjustable cam $i^5$ passing through the pawl $i$ the position of the pawl can be varied with relation to the carrier $i^4$ which latter is moved by the driving cam $i'$ through the intervention of a roller $i^6$ secured to the carrier $i^4$ the roller being maintained in contact with the cam $i$ by springs $i^7$ attached to the casing $i^8$ containing the carrier $i^4$. By this arrangement the pawl can be adjusted to drive the ratchet wheel and mandrel as required when it is desired to insert the second row of studs in the positions corresponding to the middle peripheral row of holes $a^5$ in the mandrel. When this adjustment is made, a second locking plunger $j^\times$ for engaging with holes $h'$ in the ratchet wheel is brought into operation and the first locking plunger $j$ is moved into an inoperative position. The second plunger $j^\times$ is similar as regards construction and operation in the first plunger $j$ and the corresponding parts appertaining to the second plunger $j^\times$ are indicated by similar reference letters with the addition of an index star or cross. To enable the plungers to be moved from the inoperative to the operative position and vice versa they are provided with laterally projecting knobs or handles $j^4$ $j^{4\times}$ which can be moved to vertical positions in right angled slots in the casings $j^6$ and $j^{6\times}$ containing the plungers, so as to retain the said plungers disengaged from the ratchet wheel and the lateral projections $j^3$ and $j^{3\times}$ out of the path of the rotary cams or lifters $j^2$ and $j^{2\times}$. In Fig. 8 the plunger $j^\times$ is shown in the inoperative position.

The punch $b$ and the die $c$ constituting the punching or perforating device are arranged to move in inclined bearings or guides $g'$ $g^2$ (see Fig. 1) the inclination being such that the common axis of the punch and die is approximately radial with respect to the mandrel, so that a radial hole can be punched in the tire tread to enable the stud to be correctly inserted.

Figure 1:
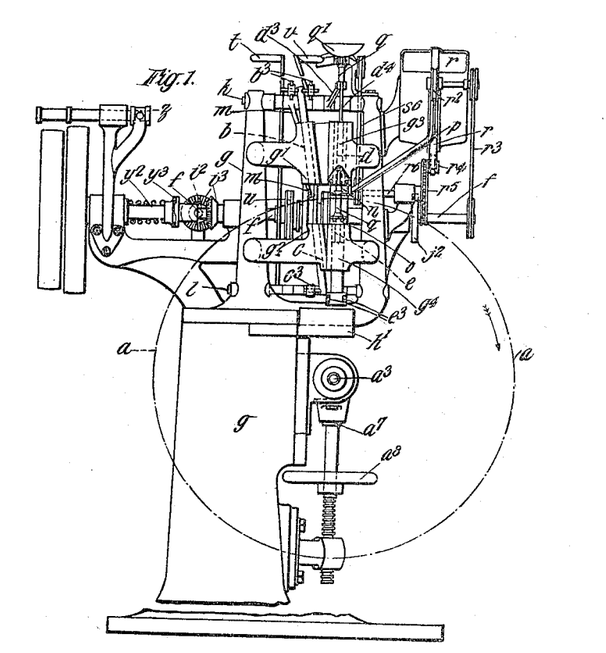
Figures 1 and 2 illustrate a part elevation and a plan respectively of one construction of the machine.

The reciprocation of the punch $b$ and die $c$ is effected by means of oppositely disposed eccentrics $b'$ and $c'$ on the main driving shaft, through the intervention of connecting straps or devices $b^2$ and $c^2$ and pivoted levers $b^3$ and $c^3$. The lever $b^3$ for the punch $b$ is centrally pivoted on a stationary shaft $k$, the rear end of the lever $b^3$ being pivotally connected to the eccentric strap $b^2$ and the front end of the lever $b^3$ being pivotally connected with the punch $b$ in such a manner that the latter can slide both laterally and longitudinally with respect to the lever $b^3$ to enable the necessary reciprocation of the punch to take place when its eccentric $b'$ is rotated to oscillate the lever $b^3$. The lever $c^3$ is centrally pivoted on a lower stationary shaft $l$ the rear end of the said lever being pivotally connected to an eccentric strap $c^2$ which as shown is shorter than the eccentric strap $b^2$ while the lower end of the die is pivotally connected to the front end of the die lever $c^3$ so as to slide relatively thereto thus enabling a reciprocating movement to be imparted to the die from the oscillating lever $c^3$. The arrangement is such that when the eccentrics $b'$ and $c'$ are rotated, the punch and die approach each other and the former which moves through a greater distance than the die, owing to the greater throw of the eccentric $b'$, pierces the tire tread passes through a hole in the mandrel and enters the die which is made hollow, in order that the punched out portion of the tire tread may drop through the die into a tray $k'$ detachably supported on the body $g$. As the eccentrics $b'$ $c'$ continue to rotate the punch $b$ and the die $c$ are moved in opposite directions to be clear of the mandrel and the tire tread supported thereon, and the mandrel is then rotated a step forward so that the next hole in the mandrel comes under the punch, in which position the mandrel is held stationary as aforesaid. In order to retain the tread firmly on the mandrel during the upward movement and withdrawal of the punch, a stripper device $m$ arranged in close proximity to the punch may be caused to bear firmly on the tire tread, and in the example shown the stripper device is in the form of a bell-crank lever pivoted to the upper stationary shaft $k$, one end being suitably shaped to engage with the tire tread, while the other end is held by a spring $m^2$, in contact with a rotary cam $m'$ mounted on the shaft $f$ or on the eccentric $b'$, the throw of the cam being so arranged as to move the stripper lever $m$ on its pivot to press the free end on the tire tread, during the withdrawal of the punch as aforesaid. As shown in Fig. 1, the punch and die are disposed on the left or in advance of the stud and washer pressers, so as to punch the holes in the tread ready to receive the studs.

Figure 19:
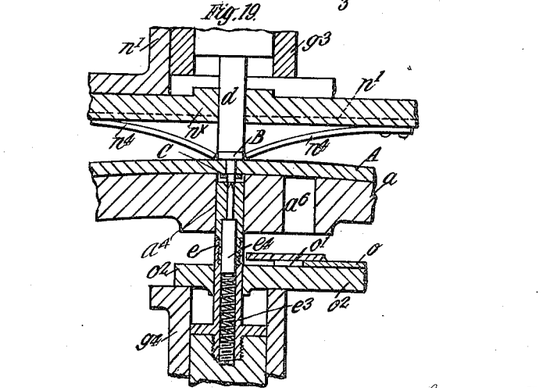
Fig. 19 is a fragmentary sectional elevation (about full size) of the various devices in the position they occupy when the stud is inserted and a washer applied thereto.

The reciprocation of the stud and washer pressers is effected by similar mechanism to that described in connection with the punch and die, the said mechanism comprising oppositely disposed eccentrics $d'$ $e'$ on the shaft $f$ and centrally pivoted levers $d^3$ $e^3$. The said presser $d$ moves in a suitable bearing or guide $g^3$, and is actuated by an eccentric $d'$ through a connecting strap $d^2$ mounted on the eccentric $d'$ and pivotally connected to the rear end of the lever $d^3$ which is centrally pivoted on the upper stationary shaft $k$. The other end of the lever $d^3$ is pivotally connected to the stud presser through the intervention of a pivoted link $d^4$, this latter connection enabling the stud presser to be reciprocated freely by the oscillating movement imparted to the stud levers. The washer presser $d$ is reciprocated in a suitable bearing or guide $g^4$ by an eccentric $e'$ (which is smaller than the eccentric $d'$) on the shaft $f$ operating through a connecting strap $e^2$ which is shorter than the strap $d^2$ pivotally secured to the rear end of a lever $e^3$, which latter is centrally pivoted to the lower stationary shaft $l$. In order that the washer presser can reciprocate freely in its bearing or guide, the forward end of the lever $e^3$ is forked and engages with slots or openings at the lower end of the washer presser, (see Figs. 1 and 2). During the rotation of the eccentrics $d'$ $e'$ the stud and washer pressers first approach each other and then recede, and owing to the different throws of the eccentrics the stud presser $d$ moves through a greater distance than the washer presser $e$. As the stud presser moves downwardly it is adapted to bear on the stud B (see Fig. 19) and force the stem of the stud into the hole in the tire tread A on the mandrel which is held stationary at this time, and simultaneously with the insertion of the stud the washer presser moves upwardly through a hole in the mandrel and applies a washer C to the stem of the inserted stud. After the stud inserting and washer applying operations are performed, the stud and washer pressers move away from each other to be clear of the mandrel and the tire tread supported thereon, which mandrel is then free to be moved ready for the insertion of another stud in the next hole in the tire tread and application of another washer, which stud and washer have by that time been moved into the positions by their respective carriers ready for the said operations to be performed.

The stud carrier $n$ is reciprocated in a horizontal guide $n'$ attached to the bearing $g^3$ by a connecting rod $n^2$ pivoted at one end to the carrier and at the other end to the stud eccentric strap $d^2$ (see Fig. 3) the stud carrier when in the inner or rear position being adapted to receive the stud from a delivery chute $p$ leading from a hopper $r$ and when in the outer or forward position the stud is supported ready to be inserted into the tire tread by the stud presser.

Figure 11:
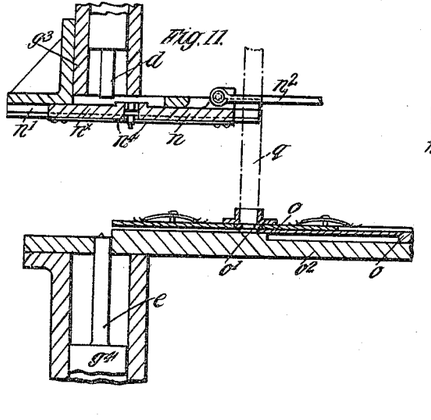
Fig. 11 is a vertical sectional view showing the stud and washer carriers and adjacent parts in the position in which a stud and washer have just been received thereby.
Figures 14, 15:
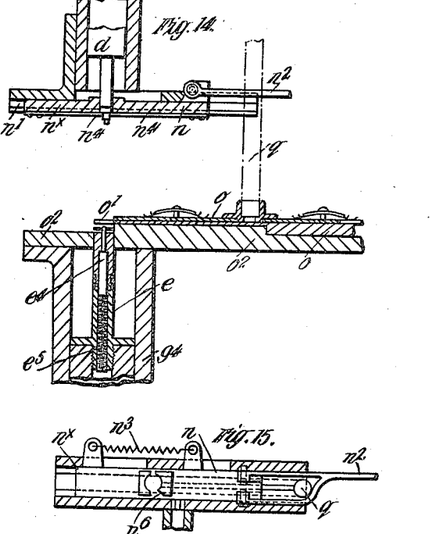
Fig. 14 is a similar view to Fig. 11, but illustrates the various parts in the position they occupy when ready for the stud inserting and securing operation to take place.
Figs. 15 and 16 are plan views of the stud and washer carriers in the position shown in Fig. 14.
Figure 16:
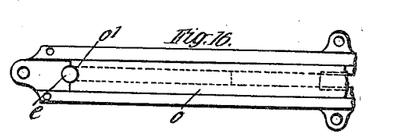
Figure 17:
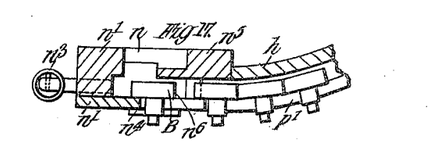
Figs. 17 and 18 are cross sectional views of the stud and washer carriers drawn to a larger scale.
Figure 18:
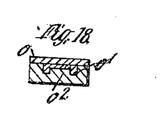

The stud carrier comprises as shown in Figs. 11, 12, 14 and 16, an inner portion and an outer portion $n^x$ which are normally pulled toward each other by a spring $n^3$, the adjacent ends of the inner and outer portions of the carrier being so formed that an opening is provided between them in which a stud can be supported when the carrier is in the outer position, by two leaf springs $n^4$ $n^4$ secured on the bottom of the carrier $n$, each spring having a free end adjacent to the aforesaid opening and shaped to support the stud by its head (see Fig. 14). When the stud is being inserted into the tire tread by the stud presser, the inner portion of the carrier has moved rearward beyond an opening $n^5$ in the guide $n'$, which opening registers with the extremity of the lower end of the chute $p$ containing the studs with their heads uppermost, so that the lowermost stud in the chute is by the weight of the others forced through the said opening $n^5$ into the path of the inner carrier; during that time however the outer carrier $n^x$ is held in the outer position by the stud presser being in its lowest position but so soon as the stud presser has moved upward sufficiently, the outer carrier $n^x$ moves inwardly, under the influence of the spring $n^3$, into contact with the received stud which is at that time supported on the bottom of the guide $n'$ as shown in Figs. 11 and 17.

Both portions of the carrier are now pushed forward by the connecting link $n^2$ which derives its movement from the eccentric strap $d^2$; the stud is thus pushed or carried to the inserting position, (see Fig. 14). During this forward movement the next successive stud in the chute is forced out of the path of the inner portion of the carrier by a beveled nose $n^6$ on the front end thereof (see Figs. 12 and 17). The stud is now in position to be inserted in the tire tread by the stud presser which in descending bears on the stud head and forces it downwardly so that the springs supporting the stud give way and release the stud at the moment it enters the tire tread. Simultaneously with this movement a washer is moved upwardly by the washer presser so that the stem of the stud which has now projected through the tire tread, enters the hole in the washer and the extremity the stud stem is burred by contact with the washer presser, thus retaining the washer in position.

The washer carrier $o$ as shown in Figs. 11, 13, 14 and 16 is in the form of a reciprocating flat bar of about the same thickness as that of a washer the outer end of the carrier being provided with an approximately circular opening $o'$ which is adapted to receive a washer from a delivery tube $q$ containing a pile or column of the washers. The washer carrier is provided with longitudinal ribs fitting grooves $o^5$ in the guide or support $o^2$ in which the carrier reciprocates when moved by an eccentric $o^3$ on the main driving shaft $f$, through the intervention of a strap $o^4$ pivotally connected to the rear end of the carrier (see Fig. 2). When the carrier is to receive a washer it is moved rearwardly until the opening $o'$ therein comes under the lower end of the washer delivery tube $q$, whereupon the lowermost washer in the tube is allowed to drop into the said opening, so as to be supported on the guide $o^2$ (see Fig. 11). The carrier $o$ (which owing to its thickness can only receive one washer at a time) is then moved forward and the washer is pushed along, until it is no longer supported on the guide; it then falls on to the top of washer presser $e$ which at this time is just below the level of the guide. The washer presser is provided with a central projecting pin $e^4$ that extends into the hole in the washer after it falls on the washer presser so as to retain the washer on the presser, the said pin being maintained in its projecting position by a spring $e^5$ contained in a central hole $e^6$ in the washer presser. During the forward movement of the washer carrier, the next succeeding washer is prevented from leaving the tube by the upper surface of the carrier upon which the said washer rests and thus supports the remaining washers in the tube.

The washer presser bearing the washer is now moved upward simultaneously with the downward movement of the stud presser and at the moment the stud is pushed into the tire tread by the stud presser, the washer presser has moved to such an extent that the stem of the stud depresses the spring controlled pin $e^4$ and projects into the hole in the washer. Simultaneously, the upper part of the washer presser comes into contact with the extremity of the stem of the stud projecting through the washer and owing to the fact that the central hole $e^6$ in the washer presser is slightly smaller than the end of the stud stem the latter which is held against upward movement by the stud presser is burred by contact with the washer presser, so as to retain the washer on the stem. The stud presser then moves upwardly out of contact with the stud and the washer presser simultaneously descends thus allowing the mandrel to be rotated ready for the next operation. Meanwhile the stud and washer carriers have moved rearwardly to receive another stud and washer respectively which are afterward moved forward to register with the next hole in the tire tread, ready for the next stud inserting and washer applying operations.

Figure 12:
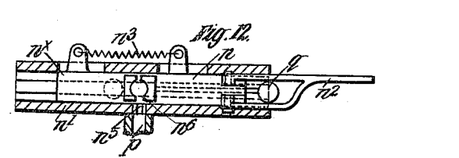
Figs. 12 and 13 are plans of the stud and washer carriers in the position shown in Fig. 11.
Figure 13:
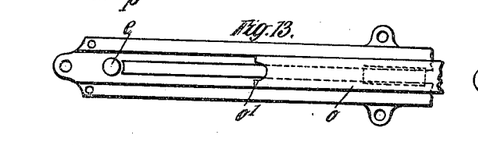

The washer delivery tube $q$ extends vertically to the upper part of the machine and passes through a slot or bifurcated portion of the connection rod $n^2$ to enable the latter and the stud carrier to move freely (see Figs. 12 and 15).

Figure 2:
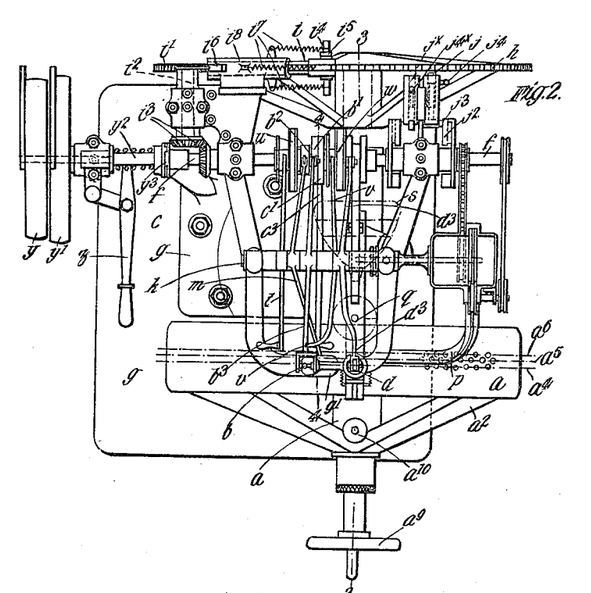
Figure 3:
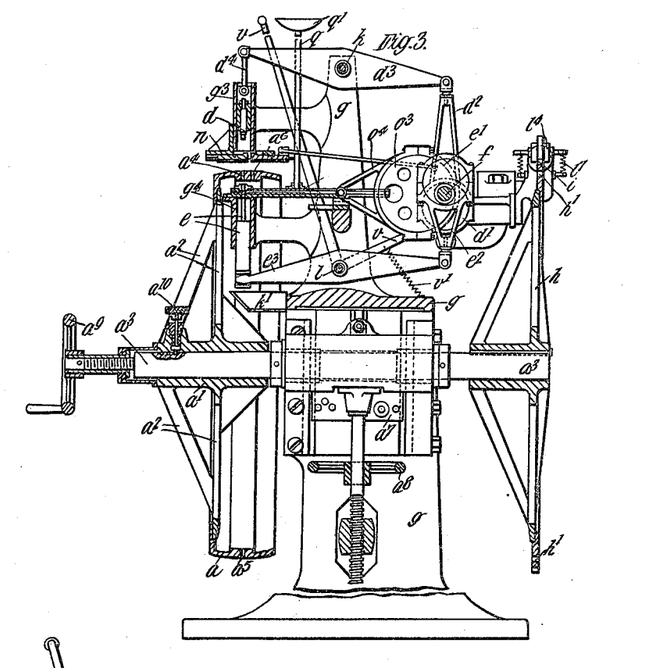
Fig. 3 illustrates a vertical section of the machine taken on the line 3—3 of Fig. 2.
Figure 21:
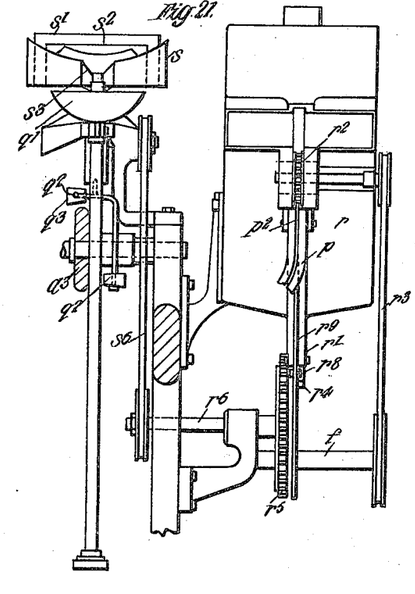
Fig. 21 is a front elevation of the stud and washer hoppers and the parts appertaining thereto.
Figure 22:
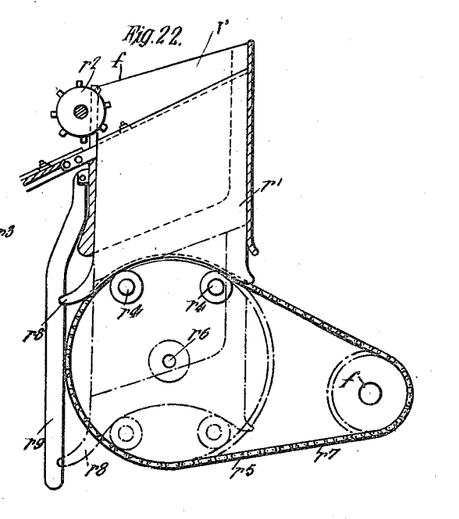
Fig. 22 is a central vertical section through the stud hopper.

In the example shown, the stud hopper $r$ from which the studs are supplied to the stud delivery chute $p$, is suitably supported on the main frame or body $g$ of the machine, and comprises an approximately rectangular box which is suitably formed to provide guides for a vertically reciprocating slide or plate $r'$ arranged midway between and parallel to the sides of the hopper (see Figs. 2, 21 and 22). The top of the slide $r'$ is inclined and grooved so that as it moves upwardly through the studs in the hopper it collects and supports a few of the studs which lie head lowermost in the grooved and inclined top. When the slide has reached its fully raised position the lower edge of the inclined top lies flush or registers with the upper end of the delivery chute, so that the few studs contained in or supported on the slide, slip by gravity into the delivery chute $p$ (see Fig. 22). If a stud supported on the slide is not in the correct position viz. head lowermost, or if a stud is not of the required shape it is prevented from entering the delivery chute by a rotating ejector wheel $r^2$ secured on a spindle which is suitably rotated from the main driving shaft by a belt $r^3$ and suitable driving pulleys. In the example shown the movement of the slide is effected by means of rollers $r^4$ $r^4$ mounted on a rotary sprocket wheel $r^5$ secured on a spindle $r^6$ deriving its motion from a sprocket wheel on the main shaft $f$ through a driving chain $r^7$. The rollers $r^4$ $r^4$ engage with the curved bottom of the slide $r'$ and they are arranged in close proximity so that the slide is supported in the fully raised position for a sufficient length of time to enable all the studs supported on the grooved top, to slip into the delivery chute. In order to retain the slide in its correct position when traveling to its lowest point indicated in dotted lines in Fig. 22, it is provided with a projecting corner $r^8$ which is notched to engage with a fixed vertical guide $r^9$ secured on the hopper.

Figure 20:
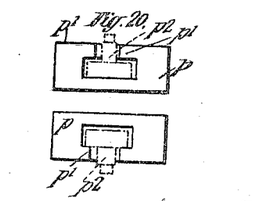
Fig. 20 represents the upper and lower ends of the stud delivery chute.

As aforesaid the delivery chute $p$ receives the studs from the hopper with the heads thereof lowermost (as shown in Fig. 20), but it is bent or twisted (see Fig. 3) so that the position of the studs is reversed when they are supplied to the stud carrier which as previously stated receives the studs head uppermost. For this purpose the delivery chute is provided with inwardly projecting edges $p'$ $p'$ that constitute a groove $p^2$ which retains the stud in the correct position, the said edges $p'$ $p'$ supporting the heads of the studs when the latter are in the position with the head uppermost ready for delivery to the stud carried (see Fig. 20).

Figure 23:
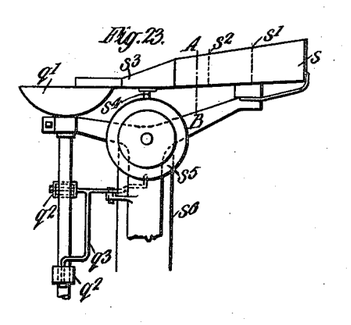
Figs. 23 and 24 are a side elevation and a rear view of the washer hopper and the parts appertaining thereto.
Figure 24:
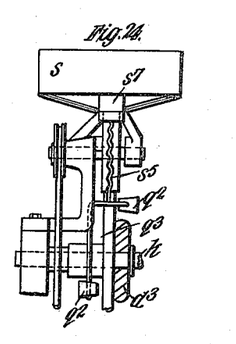
Figure 25:
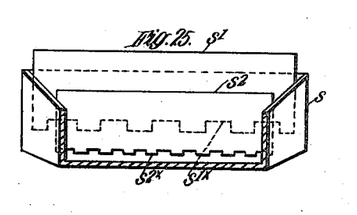
Fig. 25 is an enlarged transverse sectional view of the washer hopper.

The washers are supplied to the delivery tube $q$ from a hopper or tray $s$ which is supported in an inclined position so that the washers can slide through openings in the lower part of partitions or screens $s'$, $s^2$ situated in the tray in a spout or nozzle $s^3$ from which the said washers fall into a bowl or bell mouth $q'$ on the upper end of the delivery tube $q$. Each opening $s'^x$ in the partition $s'$ is of such size as to allow two three or four washers to pass through simultaneously and each opening $s^{2x}$ in the partition $s^2$ is of such size as to allow only one washer to pass at a time. The washers are situated at the rear of the partition $s$ and in order to assist them to slide through the openings to reach the spout $s^3$, a shaking movement is imparted to the hopper $s$, by means of a projection $s^4$ thereon engaging in a sinuous groove of a rotating cam wheel $s^5$ secured on a spindle which is driven from the spindle $r^6$ to a belt $s^6$ and suitable pulleys (see Figs. 21, 23 and 24). The washer hopper is loosely and resiliently supported by means of leaf springs $s^7$ on a suitable bracket and as the cam wheel $s^5$ rotates the tray is shaken horizontally and vertically with the result that the washers easily slide first through the openings in the partition $s'$ and then through the openings in the partitions $s^2$ and they are thus supplied with a fair regularity to the delivery tube $q$. In order to insure that the washers shall enter the tube and lie flat-wise one or the other hammers $q^2$ $q^2$ may be caused to tap alternately on the tube, then shaking the washers into their correct positions. The hammers may be mounted on the two ends of a bifurcated portion of a lever $q^3$ which is pivoted on a suitable bracket, so that the opposite end of the lever may engage with the sinuous groove in the cam wheel $s^5$.

Figure 4:
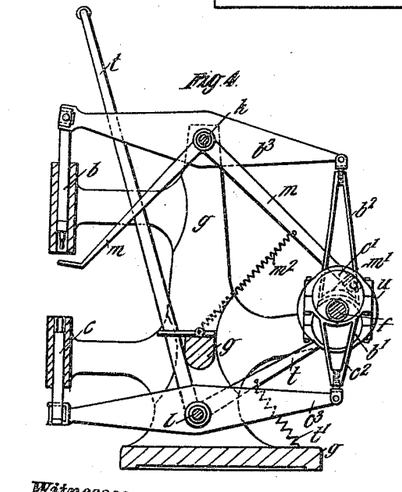
Fig. 4 is a vertical section of the upper parts of the machine taken on the line 4—4 of Fig. 2.
Figures 5, 6:
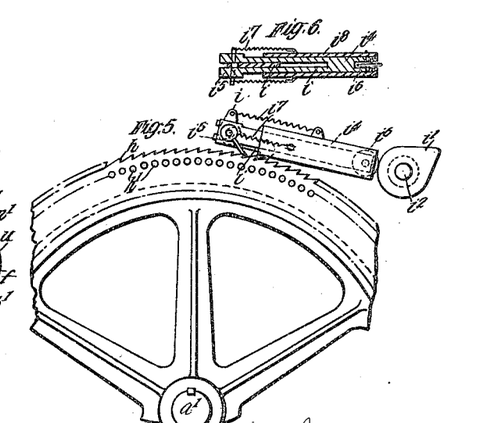
Fig. 5 is a rear elevation of a portion of the ratchet driving wheel and its operating or driving pawl.
Fig. 6 is a sectional plan of the said driving pawl.
Figure 27:
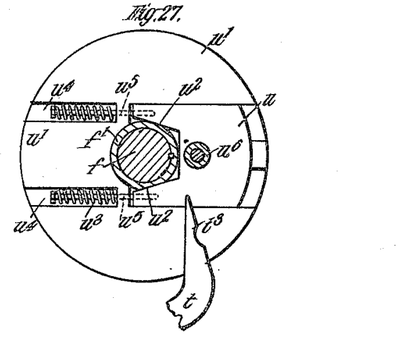
Fig. 27 is a sectional end view showing the details of one of the controlling clutches.

The operation of the punch $b$ and the die $c'$ is controlled by a hand lever $t$ which actuates a clutch $u$ for coupling and uncoupling the punch and die eccentric $b'$ $c'$ to and from the driving shaft $f$, and a hand lever $v$ controlling the operations of the stud and washer pressers, and the stud and washer carriers actuate another and similar clutch $w$ for the coupling and uncoupling of the stud and washer eccentrics $d'$ $e'$ to and from the driving shaft $f$. As the clutches $u$ $w$ are similar in construction only one of them, viz. the clutch $u$ will be described in detail, and as shown in Fig. 27, it comprises a sliding member or clutch proper $u$ mounted in the plates $u'$ which is formed in one piece with the stripper cam $m'$, and the punch and die eccentrics $h'$ $c'$, the said clutch member being provided with a notch or recess having inclined faces $u^2$ which constitute an approximately V-shaped opening. The said inclined faces are normally held by springs $u^3$ in contact or engagement with flat inclined faces on a collar $f'$ secured to the main driving shaft $f$ the spring $u^3$ being mounted in recesses $u^4$ in the plate $u'$ and surrounding adjustable rods $u^5$ screwed into the sliding clutch member. When the sliding clutch member is held in engagement with the flat faces on the collar $f'$, the rotation of the shaft causes the clutch member together with the plate $u'$ to rotate, consequently the stripper cam $m'$ and the punch and washer eccentrics $b'$ $c'$ are rotated with this shaft. In order to effect a disconnection or uncoupling of the said eccentrics and associated parts, the hand lever is actuated or moved forward against action of a spring $t'$ (see Fig. 4) so that the other end $t^2$ of the hand lever moves into engagement with a lateral projection $u^6$ on the sliding clutch member to move the latter away from the shaft so that the aforesaid inclined faces on the collar $f'$ and the sliding clutch member, become disengaged, thus leaving the shaft and its collar free to rotate in the widest part of the approximately V-shaped opening in the clutch member, without actuating the eccentrics $b'$ $c'$ and the cam $m'$. When the hand lever $t$ is moved back to its normal position in which it is retained by the spring $t'$, the spring $u^4$ draws the sliding clutch member into engagement with the collar and as the shaft rotates the aforesaid inclined faces again engage and thus lock the various eccentrics and associated parts together so that they rotate with the driving shaft $f$.

Figure 26:
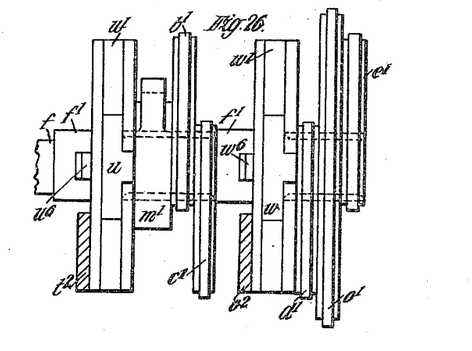
Fig. 26 is a plan of the controlling clutches and the driving eccentrics.

The stud and washer eccentrics $d'$ $e'$ and the washer slide eccentrics $o^3$ are constructed in one piece or otherwise so as to move with the plate $w'$, in which a sliding clutch member $w$ is mounted and adapted to operate in a similar manner to that described with regard to the sliding clutch member. The hand lever $v$ for controlling the stud inserting and washer applying operations, is similar to the hand lever $t$ and engages with a lateral projection $w^6$ on the sliding clutch member (see Fig. 26) to effect the uncoupling of the eccentrics from the driving shaft $f$.

The cycle of operations above described, viz. the punching operation, and the operations of the stud presser, the stud carrier, the washer presser and the stud carrier take place during each periodical stoppage of the mandrel and at the end of each of the three cycles of operations all the various contrivances are clear of the mandrel so that the latter may be rotated a step farther in the forward direction ready for another cycle of the operations to take place. By means of the hand levers $t$ $v$ which control the punching operations and the stud inserting and securing operation as described above, these two operations may be performed either independently of each other or simultaneously, the said hand levers being conveniently arranged (see Figs. 2 and 3) to enable them to be moved either together by one hand or separately according to requirements.

In starting the operation of the machine after the mandrel with the tire tread has been adjusted to the proper position by the hand wheel $q^9$ and secured therein by the locking pin $a^{10}$ engaging with the shaft $a'$, the hand lever $t$ is actuated to allow the clutch and the associated eccentrics $b'$ $c'$ to be coupled to the main driving shaft, thereby setting the punch and die in operation. A few holes are made in the tire tread, and when the mandrel has moved to a position in which the first pierced hole comes under the stud presser, the hand lever $v$ is actuated to allow the clutch $w$ to couple the associated eccentrics $d'$ $c'$ to the main driving shaft, as a result of which a stud is inserted in the first hole and secured by a washer in the manner previously described. The machine then operates automatically to bring about the punching operation and the stud inserting and securing operation these operations being performed simultaneously until the first inserted stud comes under the punch, which is then thrown out of action by actuating the hand lever $f$ as aforesaid. The stud inserting and securing operation and the rotation of the mandrel are continued however until a stud is inserted in the last pierced hole in the tire tread, and then the stud and washer pressers and respective carriers $n$ and $o$ are rendered inoperative by actuating the hand lever $v$. The mandrel is then adjusted on its shaft $a'$ by the hand wheel $a^9$ so that the second or middle row $a^5$ of circumferential holes in the mandrel is in the vertical plane of the punch and die and the stud and washer pressers, whereupon the mandrel is locked to the shaft $a'$. As the second row of holes is staggered with respect to the first row, the driving pawl $i$ is adjusted to its second position relatively to the ratchet wheel $n$, and the second plunger $j^x$ is moved to become operative while the first plunger $j$ is moved to the inoperative position. The punching operation and the studding inserting and securing operation are now performed as before to complete the second or middle row of studs. When the second row is completed the mandrel is again adjusted on the shaft $a'$ to enable the third row to be commenced and as this row is to correspond to the first row, the driving pawl $i$ is adjusted to the first position and the first plunger $j$ is again used, while the second plunger $j^x$ is moved to the inoperative position, the punching operation and stud inserting and securing operation being then performed as before. Any number of circular rows of studs may be applied to the tire cover by the machine, the position of the studs in each alternate circular row being similar, the driving pawl $i$ and locking plungers $j$ $j^x$ requiring to be adjusted accordingly.

Different diameters of tires may be provided with studs in the machine, for which purpose the horizontal position or height of the mandrel shaft $a'$ is adjusted and different mandrels corresponding to the various diameters of the tire treads are provided. For each diameter of the mandrel a corresponding ratchet driving wheel must be used, but the same operating or driving mechanism may be employed in each case.

Figure 28:
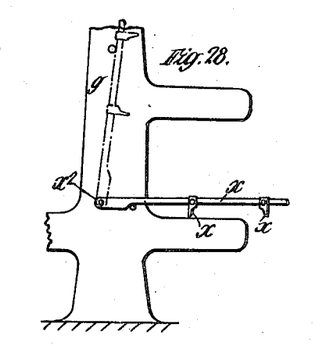

The machine may be provided with a gage device or bar $x$ on which sliding pointers (see Fig. 28) $x'$ $x'$ are mounted to enable the tire tread to be correctly positioned on the mandrel, the said bar being pivoted at $x^2$ to the frame $g$ at a suitable position, so as to be capable of movement to an inoperative position indicated by dotted lines.

The main shaft $f$ may be provided with a fast pulley $y$ and a loose pulley $y'$, the position of the driving belt being controlled by a hand actuating lever $z$. A flywheel may also be provided on the shaft to produce the necessary momentum for accomplishing the punching operation and the stud inserting and securing operation. The pulleys may be mounted on a sleeve $y^2$ which is connected to the shaft by a spring controlled safety clutch $y^3$ which allows the sleeve to rotate without actuating the shaft if an abnormal strain on the shaft occurs as a result of any part of the machine getting out of order and not operating properly.

What we claim and desire to secure by Letters Patent of the United States is:—

1. A tire studding machine comprising in combination, an annular support on which the tire tread is mounted, means to move said support intermittently, means to insert studs in the tire tread and means to apply and secure a retaining washer to the stem of each inserted stud.

2. A tire studding machine comprising in combination, means to perforate a tire tread, means to insert and secure studs in the perforations, and means to enable the said perforating operation and the said stud inserting and securing operations being performed either separately or simultaneously.

3. A tire studding machine comprising in combination, a movable perforated annular support on which the tire tread is mounted, a punching or perforating device, a stud inserting device, and mechanism for applying and securing a washer on each inserted stud.

4. A tire studding machine comprising in combination, a stud inserting device, a washer applying and securing device, separate means to feed the studs and washers automatically and successively to the stud inserting device and the washer applying and securing device and a movable perforated support in the form of an annular rim on which the tire tread is mounted disposed between said devices.

5. A tire studding machine comprising in combination, a movable perforated support in the form of an annular rim on which the tire tread is mounted, separate stud and washer supplying devices, separate stud and washer carriers to move one stud and one washer at a time into a position for applying to the tire tread and then to release the studs and washers, means to insert the studs into the tire tread and means to apply and secure the washers to the inserted studs.

6. A tire studding machine comprising in combination, a movable perforated support in the form of an annular rim on which the tire tread is mounted, a stud inserting device which presses the stud stem into the tire tread and a washer applying device having a central recess formed with a sharp edge which burs the end of the stud stem after the washer is in position thereon.

7. A tire studding machine comprising in combination, a movable perforated support in the form of an annular rim on which the tire tread is mounted, a stud inserting device, a stud carrier which releases the stud when the stud inserting device presses the stud into the tire tread a washer applying device which moves a washer on to the inserted stud stem and which is provided with a central recess having a sharp edge to bur the end of the stud stem to retain the washer on the stud.

8. In a tire studding machine, a circular mandrel shaped to carry the tire tread and provided with a series of perforations that permit of the studs being inserted and secured in the tire tread, and means to intermittently rotate said mandrel after each stud is inserted and secured in position.

9. A tire studding machine comprising in combination, an intermittently rotatable mandrel in the form of an annular rim on which the tire tread is mounted, means to insert the studs in the tire tread and means to axially move the mandrel so that the studs can be inserted in circumferential rows.

10. A tire studding machine comprising in combination, a punching or perforating device, a stud inserting device, a washer applying device, means to reciprocate the stud device in the same plane, a movable perforated support shaped to carry the tire tread and means to adjust said support in a direction at right angles to said plane.

11. A tire studding machine comprising in combination, a movable annular support on which the tire tread is mounted, a reciprocating punching or perforating device, reciprocating stud inserting and washer applying devices, oscillatory levers to reciprocate said devices, and rotating eccentrics to actuate said levers.

12. A tire studding machine, comprising in combination, a movable perforated support in the form of a perforated annular rim on which the tire tread is mounted, means to apply the studs to the tire tread, mechanism to move intermittently the support for the tire tread and means for insuring equal movements of said support and positively locking the support in its stationary positions.

13. A tire studding machine comprising in combination, means to insert and secure the studs in the tire tread, a circular support or mandrel for the tire tread, driving means to rotate the mandrel, means to axially adjust said mandrel and means to adjust said driving means with respect to the mandrel when the latter is axially adjusted.

14. A tire studding machine comprising in combination, means to insert and secure the studs in the tire tread, a circular support or mandrel for the tire tread, a ratchet wheel and operating pawl to intermittently rotate the mandrel, means to axially adjust the mandrel and means to vary the position of said operating pawl with respect to said ratchet wheel when the mandrel is axially adjusted.

15. A tire studding machine, comprising in combination, stud inserting and securing mechanism, a circular support or mandrel, shaped to carry the tire tread, a ratchet wheel and an operating pawl to rotate said support intermittently, means to axially adjust said support, means to adjust said pawl relatively to the ratchet wheel when the support is axially adjusted and automatically operated devices to engage with the said ratchet wheel to lock said ratchet wheel and support in their stationary positions.

16. A tire studding machine comprising in combination, a punching or perforating device, stud inserting and washer applying devices, actuating means for said devices, a support in the form of an annular rim on which the tire tread is mounted, and means to move the support after each stud is inserted and supplied with a washer.

17. A tire studding machine comprising in combination, a stud inserting and securing mechanism, a circular tire tread support, driving means to rotate said support intermittently, means to adjust said driving means, spacing means to insure equal movements of said support, locking means to hold said support in its stationary positions, and means to adjust the position of said spacing and locking means when the driving means are adjusted.

18. A tire studding machine comprising in combination, stud inserting and securing mechanism, a circular support or mandrel for the tire tread having a series of peripheral rows of holes each alternate row being staggered with respect to the adjacent rows, means for adjusting said support so that each peripheral row can register with the stud inserting and securing mechanism, a ratchet driving wheel connected with said support or mandrel, and an adjustable driving pawl to actuate said ratchet wheel.

19. A tire studding machine comprising in combination, stud inserting and securing mechanism, a circular support or mandrel for the tire tread having a series of peripheral rows of holes each alternate row being staggered with respect to the adjacent rows, means for adjusting said support so that each peripheral row can register with the stud inserting and securing mechanism, a ratchet driving wheel connected with said support or mandrel, an adjustable driving pawl to actuate said ratchet wheel, reciprocating plungers for engaging and locking said ratchet wheel one of which is operative while the other is inoperative, and automatic means for reciprocating said plungers.

20. In a tire studding machine, a movable perforated support shaped to carry the tire tread, a stud inserting device, a washer securing device, a device for receiving and moving the washers to the position ready to be secured to a stud stem, comprising a fixed support or guide, and a bar which is movable upon said fixed support or guide and which has an opening to receive the washer that is supported by the said guide until it reaches the washer securing device, whereupon the washer falls on to the latter, the arrangement being such that only one washer at a time can be received and moved to the securing device, which latter is formed with a sharp edged recess to bur the end of the stud stem after the washer has been applied thereto.

21. In a tire studding machine, a movable perforated support, in the form of an annular rim on which the tire tread is mounted, a device for applying and securing a washer to each stud when inserted in the tire tread in combination with means that maintains the washer in the correct position relatively to the stud, the washer securing device being formed with a sharp edged recess to bur the end of the stud stem after the washer has been applied thereto.

22. In a tire studding machine, a movable support in the form of an annular perforated rim on which the tire tread is mounted, a device to apply and secure a washer to each stud when inserted in the tire tread in combination with a projecting center pin which is capable of relative movement in the washer applying device, the latter being formed with a sharp edged recess which burs the end of the stud stem after the washer has been applied thereto.

23. A tire studding machine, a movable perforated support shaped to carry the tire tread, comprising a perforating device, a stud inserting and securing device, separate and independent actuating mechanism for each device, and hand operated means to control said mechanisms so that they may be actuated simultaneously or independently.

24. A tire studding machine comprising in combination a perforating device, a stud inserting and securing device, a separate set of actuating eccentrics for each device, a clutch associated with each set of eccentrics, a spring controlled member associated with each clutch, a driving shaft normally engaged by said members and hand actuated means to disengage said members from the driving shaft.

In testimony whereof we affix our signatures in presence of two witnesses.

WILLIAM ALFRED TURPIN.
DONALD GARDNER SNODGRASS,

Witnesses to the signature of William Alfred Turpin:
 A. CUNNINGHAM,
 A. C. LITTLEDALE.

Witnesses to the signing hereof by the said Donald Gardner Snodgrass:
 P. C. HANLON,
 FRANK M. AULT.

Copies of this patent may be obtained for five cents each, by addressing the "Commissioner of Patents, Washington, D. C."